(12) United States Patent
Siomina et al.

(10) Patent No.: US 9,188,660 B2
(45) Date of Patent: Nov. 17, 2015

(54) NETWORK-SIDE REMOVAL OF POSITIONING ASSISTANCE AMBIGUITY VIA SELECTIVE DELAY OF ASSISTANCE DATA TRANSMISSION

(75) Inventors: Iana Siomina, Solna (SE); Yang Zhang, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 831 days.

(21) Appl. No.: 13/390,366

(22) PCT Filed: Jan. 19, 2012

(86) PCT No.: PCT/SE2012/050041
§ 371 (c)(1),
(2), (4) Date: Feb. 14, 2012

(87) PCT Pub. No.: WO2012/108812
PCT Pub. Date: Aug. 16, 2012

(65) Prior Publication Data
US 2012/0208566 A1   Aug. 16, 2012

(30) Foreign Application Priority Data
Feb. 11, 2011   (WO) ................ PCT/CN2011/000211

(51) Int. Cl.
*H04W 24/00*   (2009.01)
*G01S 5/02*   (2010.01)
*H04W 64/00*   (2009.01)

(52) U.S. Cl.
CPC .............. *G01S 5/0236* (2013.01); *H04W 64/00* (2013.01)

(58) Field of Classification Search
CPC ....... G01S 19/05; G01S 19/07; G01S 19/256; G01S 5/0045; G01S 5/009; G01S 19/25; G01S 19/06; H04W 64/00; H04W 4/02; H04W 8/18; H04W 48/08; H04W 52/0245; H04W 52/028; H04W 4/04; H04W 4/20; H04W 24/10; H04M 2250/10; H04M 1/72522; H04M 1/7253; H04M 1/72572; H04M 2250/06; H04L 67/18; H04L 67/26

USPC ......... 455/456.5, 456.6, 456.1; 342/458, 450, 342/451
See application file for complete search history.

(56) References Cited

U.S. PATENT DOCUMENTS 6,671,377 B1   12/2003  Havinis et al.
8,781,506 B2 *  7/2014  Siomina et al. ............ 455/456.6
(Continued)

FOREIGN PATENT DOCUMENTS

CN   101504454 B   1/2011
EP    1289331 A2   3/2003
(Continued)

OTHER PUBLICATIONS

Patent Search Report, application No. 2012800085070. Date: Jul. 24, 2014. SIPO, Beijing, CN.

*Primary Examiner* — Nimesh Patel
(74) *Attorney, Agent, or Firm* — Coats & Bennett, P.L.L.C.

(57) ABSTRACT

A network node (44) assists a user equipment (36) to perform positioning measurements on positioning signals (46) transmitted by one or more cells during respective positioning occasions of those cells. The node (44) selectively delays transmission of assistance data to the user equipment (36) as needed, based on defined uncertainty in one or more timing parameters, for the network node (44) to identify with certainty between which two consecutive positioning occasions of a reference cell the user equipment (36) will receive that assistance data. The node (44) correspondingly generates the assistance data to be transmitted to indicate positioning occasion timing for at least one cell relative to the latter of those two consecutive positioning occasions of the reference cell. Such calculation and transmission enables the user equipment (36) to be certain that the next reference cell positioning occasion occurring after its reception of the assistance data is the reference cell positioning occasion on which the assistance data is based.

29 Claims, 13 Drawing Sheets

(56) References Cited

U.S. PATENT DOCUMENTS

| | | |
|---|---|---|
| 8,849,302 B2 * | 9/2014 | Siomina et al. ............ 455/456.1 |
| 2005/0090266 A1 | 4/2005 | Sheynblat |
| 2006/0267841 A1 | 11/2006 | Lee et al. |
| 2009/0248178 A1 * | 10/2009 | Paulson et al. ................... 700/66 |
| 2010/0007552 A1 * | 1/2010 | Oda et al. ................. 342/357.09 |
| 2011/0016804 A1 | 1/2011 | Howard et al. |
| 2011/0081917 A1 * | 4/2011 | Frank et al. ................ 455/456.1 |
| 2011/0105144 A1 * | 5/2011 | Siomina et al. ............ 455/456.1 |

FOREIGN PATENT DOCUMENTS

| | | |
|---|---|---|
| WO | 2007023446 A1 | 3/2007 |
| WO | 2011016804 A1 | 2/2011 |
| WO | 2011056119 A1 | 5/2011 |
| WO | 2011142710 A1 | 11/2011 |
| WO | 2012021097 A2 | 2/2012 |
| WO | 2012023893 A1 | 2/2012 |
| WO | 2012044246 A1 | 4/2012 |

* cited by examiner

```
ProvideAssistanceData-r9-IEs ::= SEQUENCE {
    commonIEsProvideAssistanceData    CommonIEsProvideAssistanceData   OPTIONAL,  -- Need ON
    a-gnss-ProvideAssistanceData      A-GNSS-ProvideAssistanceData     OPTIONAL,  -- Need ON
    otdoa-ProvideAssistanceData       OTDOA-ProvideAssistanceData      OPTIONAL,  -- Need ON
    epdu-Provide-Assistance-Data      EPDU-Sequence                    OPTIONAL,  -- Need ON
    ...
}
```

FIG. 3
(PRIOR ART)

```
-- ASN1START

OTDOA-ProvideAssistanceData ::= SEQUENCE {
    otdoa-ReferenceCellInfo      OTDOA-ReferenceCellInfo        OPTIONAL,
    otdoa-NeighbourCellInfo      OTDOA-NeighbourCellInfoList    OPTIONAL,
    otdoa-Error                  OTDOA-Error                    OPTIONAL,
    ...
}

-- ASN1STOP
```

*FIG. 4*
*(PRIOR ART)*

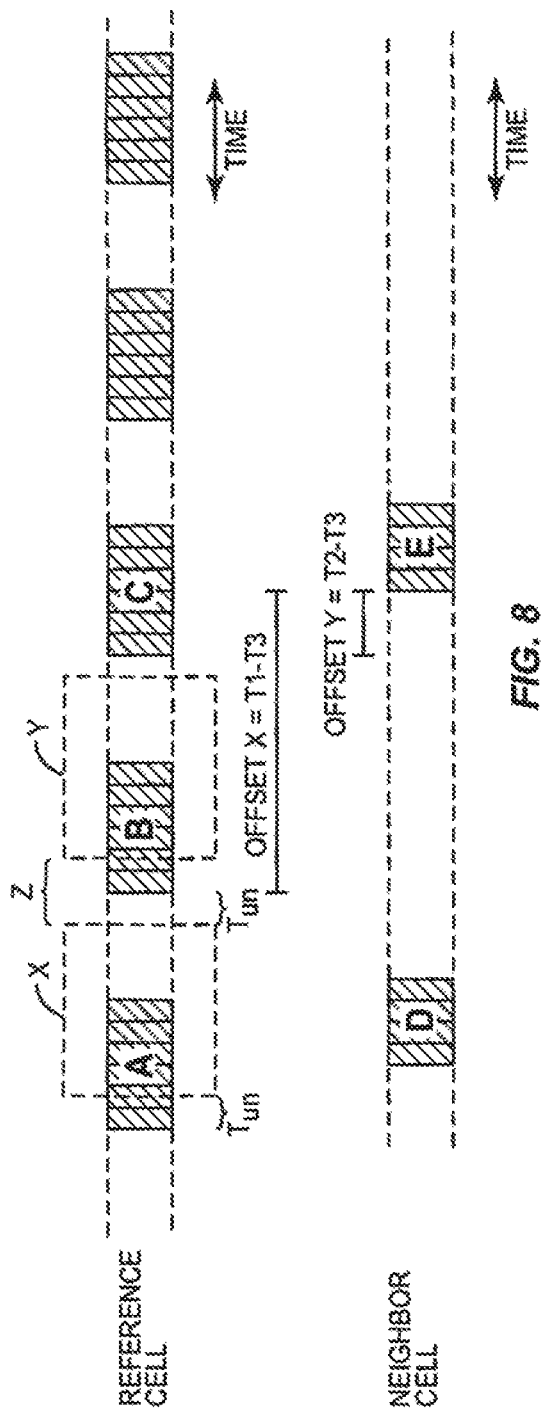
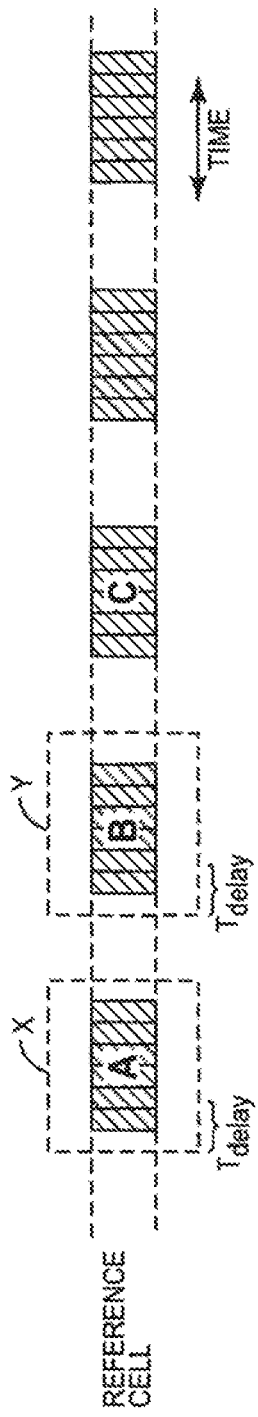
FIG. 8
FIG. 9

NETWORK-SIDE REMOVAL OF POSITIONING ASSISTANCE AMBIGUITY VIA SELECTIVE DELAY OF ASSISTANCE DATA TRANSMISSION

RELATED APPLICATION

This application claims priority from International Patent App. No. PCT/CN2011/000211, which was filed on 11 Feb. 2011 and was entitled "Non-Ambiguous Positioning Measurements with Cell-Specific Signal Periodicity."

TECHNICAL FIELD

The present invention generally relates to transmitting data to a user equipment for assisting the user equipment in performing measurements on periodic positioning signals, and particularly relates to selectively delaying the transmission of that data in order to mitigate potential ambiguity arising within the data.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all UE, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signalling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Enhanced Serving Mobile Location Center, E-SMLC, or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. SUPL protocol is used as a transport for LPP in the user plane, LPP has also a possibility to convey LPP extension messages inside LPP messages, e.g. currently Open Mobiel Alliance (OMA) LPP extensions are being specified (LPPe) to allow e.g. for operator-specific assistance data or assistance data that cannot be provided with LPP or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

To meet varying demands for different Location-Based Services (LBS), an LTE network will deploy a range of complementing methods characterized by different performance in different environments. Depending on where the measurements are conducted and where the final position is calculated, the methods can be UE-based, UE-assisted, or network-based, each with own advantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Several other techniques such as hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP. Similar methods, which may have different names, also exist for radio-access technologies (RATs) other than LTE, such as CDMA, WCDMA or GSM.

With particular regard to the OTDOA positioning method, this method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighbouring eNodeBs.

More specifically, the UE measures the timing differences for downlink reference signals received from multiple distinct locations or neighboring cells. For each (measured) neighbor cell, the UE measures Reference Signal Time Difference (RSTD), which is a relative timing difference between the neighbor cell and a defined reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift, which is a function of Physical Cell Identity (PCI), can be applied to the specified PRS patterns to generate orthogonal patterns. The mapping of frequency shifts to PCT models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) could be used for positioning measurements, in principle.]

PRS are transmitted in pre-defined positioning sub-frames grouped by several consecutive sub-frames ($N_{PRS}$), i.e., one positioning occasion. FIG. 2, for instance, shows an example where one positioning occasion includes PRS transmitted in $N_{PRS}=6$ consecutive sub-frames. Positioning occasions occur periodically with a defined periodicity $T_{PRS}$ of N sub-frames, i.e., the time interval between two positioning occasions. The standardized periods $T_{PRS}$ are 160, 320, 640, and 1280 ms, and the standardized number of consecutive sub-frames $N_{PRS}$ may be 1, 2, 4, or 6

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

In LTE, the assistance data may be requested and provided over LPP protocol by including requestAssistanceData and provideAssistanceData elements in the LPP message, respectively. The current LTE standard specifies the following structure for provideAssistanceData, which is illustrated in FIG. 3, where the commonIEsProvideAssistanceData information element (IE) is provided for future extensibility only and is not used so far. The LTE assistance data may thus be provided for A-GNSS and OTDOA. The EPDU-Sequence contains IEs that are defined externally to LPP by other organizations, which currently may only be used for OMA LPP extensions (LPPe).

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occassion, PRS transmission bandwidth, frequency, etc.

In LPP, the OTDOA assistance data is provided within the Information Element (IE) OTDOA-ProvideAssistanceData, as shown in FIG. 4. Similar structures for OTDOA exist in LPPe.

The OTDOA assistance data includes information about the reference cell and neighbour cells for which OTDOA is to be determined. The neighbour cells may or may not be on the same frequency as the reference cell, and the reference cell may or may not be on the same frequency as the serving cell, and may or may not be the serving cell. Measurements that involve cells on a frequency different than the serving cell are inter-frequency measurements. Measurements on the same frequency as the serving cell are intra-frequency measurements. Different requirements apply for intra- and inter-frequency measurements.

For each cell in the assistance data, PRS information may be provided. The following information comprises the PRS information, according to 3GPP TS 36.355: PRS, bandwidth, PRS configuration index, the number $N_{PRS}$ of consecutive DL subfrarnes (1, 2, 4, or 6) where PRS are transmitted, and muting information, PRS configuration index for a cell, as specified in 3GPP TS 36.211, defines the offset of that cell's first PRS subframe from a reference time point (SFN=0, where SFN refers to System Frame Number), as well as the periodicity $T_{PRS}$ of that cell's positioning occasions.

PRS information, in particular PRS periodicity, may be cell-specific. The cell-specific nature of the PRS information may be attributable to different cells belonging to different systems, different cells having different PRS bandwidths (e.g., a smaller bandwidth may require more frequent PRS occasions), different cells having different traffic loads (e.g., to reduce PRS overhead and capacity loss when no data transmissions are allowed in PRS positioning occasions, less frequent PRS positioning occasions may be configured), or the like.

Furthermore, positioning occasions may be misaligned on purpose, e.g., due to network deployment issues. Such purposeful misalignment might exist, for instance, in a network with a mix of macro cells and low-power nodes (e.g., pica or femto nodes), since interference issues may be caused by that network deployment. In a synchronous, or at least subframe-aligned network, an alternative could be to configure more frequent PRS positioning occasions that are aligned for cells, but to configure muting to avoid PRS collisions with interfering neighbour cells. See, e.g., International Patent Application PCT/SE2010/050947.

Positioning occasion misalignment may also be attributable to inter-frequency RSTD measurements. More particularly, some UEs require measurement gaps in order to perform inter-frequency RTSD measurements. The measurement gaps are configured by an eNodeB upon an indication from a LIE. Measurement gaps need to be aligned with PRS positioning occasions of the measured cell. However, according to the standard, the measurement gaps cannot collide with PRS positioning occasions of the cells belonging to the serving carrier. Given that the PRS periodicity is a multiple of the measurement gap periodicity (40 ms, when inter-frequency RSTD measurements are configured), this means that PRS positioning occasions of a neighbour cell cannot collide with PRS positioning occasion of the reference cell. So, in networks supporting inter-frequency RSTD measurements, particularly with UEs using measurement gaps for inter-frequency measurements, PRS positioning occasions shall be misaligned between cells on the serving carrier and another carrier. This implicitly means that PRS positioning occasions shall be misaligned among all carriers that may appear in the same assistance data message for a UE, since different UEs may be served by different cells. Nonetheless, PRS positioning occasions will typically be fully or partially aligned in cells operating on the same frequency. However, there is no reason to require PRS positioning occasion to be the same on all frequencies.

In view of these different timing possibilities for PRS, assistance data provided to a UE assists the UE to determine at least the relationship between the timing of different PRS (e.g., relative to the timing of PRS for the reference cell). For example, the following parameters specified in 3GPP TS 36.355 may be used for determining the timing relation between PRS signals received in the first subframes of the positioning occasions of two cells: (a) slotNumberOffset; (b) prs-SubframeOffset; (c) expectedRSTD; (d) expectedRSTD-Uncertainty; (e) prs-Configurationindex. Then, based on muting information (prs-MutingInfo), the UE also can determine in which positioning occasions the LIE is supposed to measure.

Nonetheless, known approaches for employing assistance data remain insufficient for supporting cell-specific PRS configurations. Indeed, practical scenarios may arise where known approaches cause a UE to incorrectly determine the timing relation between a positioning occasion of one cell and a positioning occasion in another cell. Indeed, in such a scenario, one timing relation appears correct to the node generating the assistance data, and a different timing relation appears correct to the UE receiving the assistance data. This ambiguity in which timing relation is correct leads to the UE's incorrect determination.

Although the above problems have primarily been discussed in the context of certain wireless systems and certain positioning methods, these problems extend to other systems and other methods as well. Indeed, with Open Mobile Alliance (OMA) LPP extension (LPPe), the assistance data is enhanced with the possibility to assist a larger range of positioning methods. For example, the assistance data may also be provided for E-CID or other methods of other radio access technologies (RATs), e.g. OTDOA UTRA or E-OTD GSM, or other PLMN networks.

SUMMARY

Embodiments herein advantageously eliminate or at least mitigate timing ambiguities associated with when a user equipment is to perform assisted positioning measurements. Broadly described, a network node times its transmission of assistance data to the user equipment in a way that enables the node to be certain about between which two positioning occasions of the reference cell the user equipment will receive the data. This in turn enables the user equipment to be certain about how the network node calculated the positioning measurement timing specified in the assistance data.

More particularly, a network node herein is configured to perform processing for assisting a user equipment to perform positioning measurements on positioning signals periodically transmitted by one or more cells during respective positioning occasions of those cells. The processing includes selectively delaying transmission of assistance data to the user equipment as needed, based on defined uncertainty in one or more timing parameters, for the network node to identify with certainty between which two consecutive positioning occasions of a reference cell the user equipment will receive that assistance data. The processing further includes generating the assistance data to be transmitted to indicate positioning occasion timing for at least one cell relative to the latter of those two consecutive positioning occasions of the reference cell.

In some embodiments, for example, the network node's selective delay entails determining whether or not a first time window for the assistance data transmission has passed. If the node were to transmit the assistance data during this time window, then the node would be able to identify with certainty that the user equipment will receive the assistance data between first and second positioning occasions of the reference cell. If this first time window has passed, however, the node delays the assistance data transmission until a second time window that would permit such identification with respect to second and third reference cell positioning occasions. Notably, the network node computes these time windows so that they exclude a time interval therebetween in which the node is uncertain about whether assistance data transmitted during that interval would be received by the user equipment between the first and second reference cell positioning occasions, or between the second and third reference cell positioning occasions.

In at least one embodiment, for example, the network node computes the first time window as being a window of time between the start of the first and second reference cell positioning occasions that has been shortened at both ends by the defined uncertainty and shifted by a defined signaling delay between the network node and the user equipment. Likewise, the network node computes the second time window as being a window of time between the start of the second and third reference cell positioning occasions that has been shortened at both ends by the defined uncertainty and shifted by the defined signaling delay.

Regardless, if the network node transmits the assistance data during the first time window, the node generates that data to indicate positioning occasion timing relative to the second reference cell positioning occasion. Conversely, if the network node transmits the assistance data during the second time window, the node generates that data to indicate positioning occasion timing relative to the third reference cell positioning occasion.

Thus, when the user equipment receives the assistance data, that data indicates positioning occasion timing for at least one cell relative to the next positioning occasion of the reference cell that it is to occur after such reception. Indeed, because of the way that the network node calculated and transmitted the assistance data, the user equipment can be certain that the next reference cell positioning occasion occurring after its reception of the assistance data is the reference cell positioning occasion on which the assistance data is based. The user equipment then calculates local positioning occasion timing for that at least one cell as a function of the positioning occasion timing indicated for that cell. Such local positioning occasion timing is relative to the first reference cell positioning occasion at which the user equipment is to begin positioning measurements, rather than being relative to the next reference cell positioning occasion occurring after assistance data reception. The user equipment correspondingly times assisted positioning measurements for the at least one cell based on the local positioning occasion timing calculated for that cell.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 illustrates a data structure for the provideAssistanceData element specified by prior art LTE standards.

FIG. 4 illustrates a data structure for the OTDOA-ProvideAssistanceData element specified by prior art LTE standards.

FIG. 8 is an example that illustrates a network node's delaying of the transmission of assistance data according to one or more embodiments.

FIG. 9 is an example that illustrates a network node's delaying of the transmission of assistance data according to one or more other embodiments.

DETAILED DESCRIPTION

Figure 1:
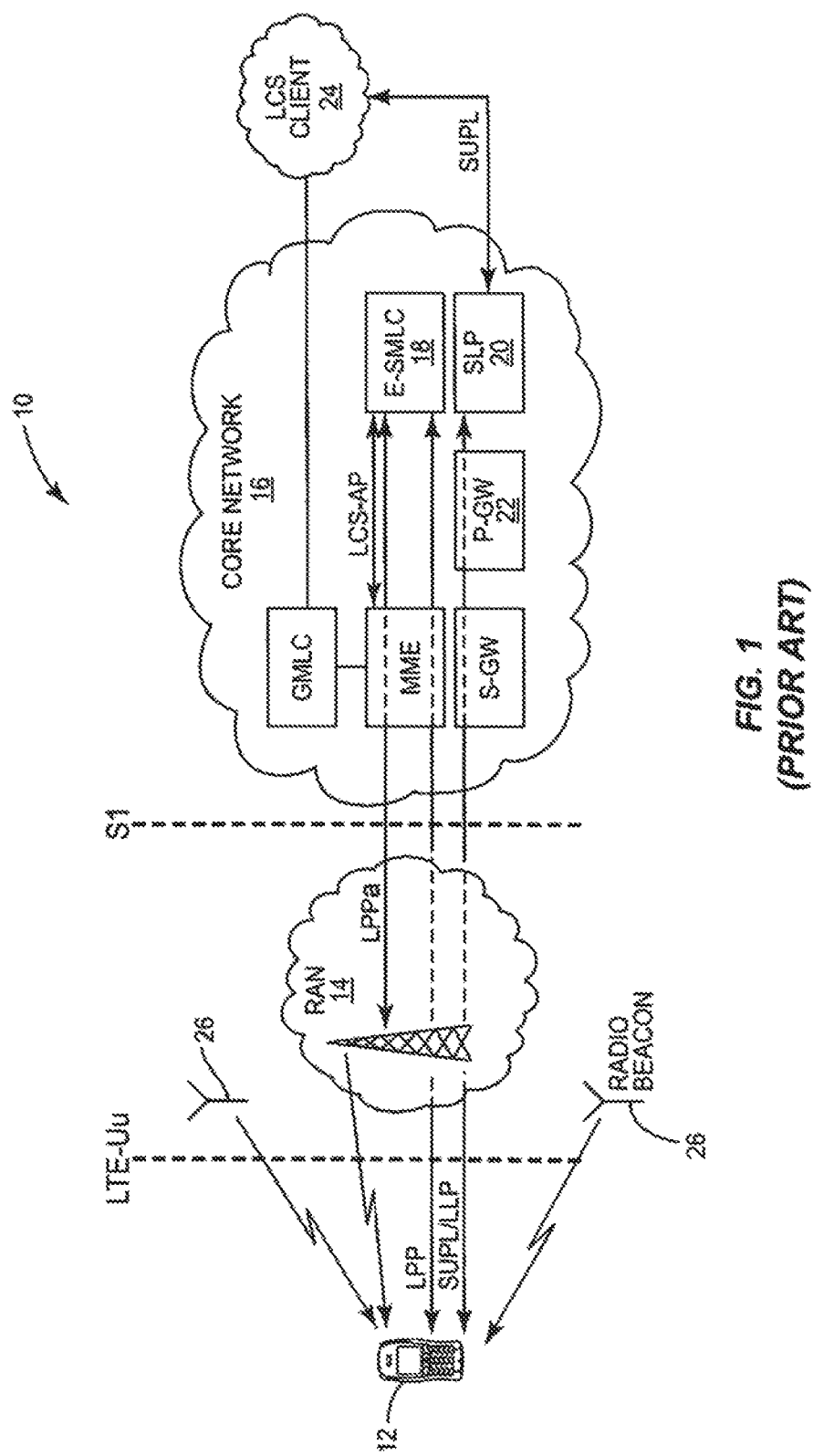
FIG. 1 is a block diagram of an LTE system configured to determine the geographic position of a user equipment.
Figure 2:
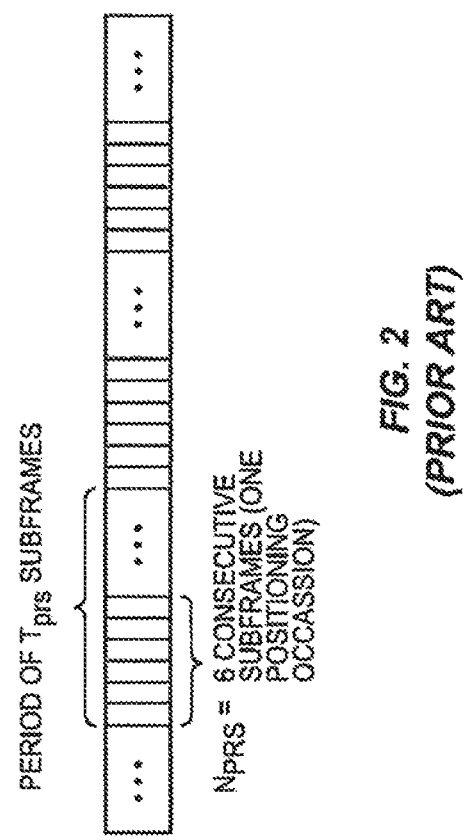
FIG. 2 illustrates the structure and timing of positioning reference signals in an LTE system.

FIG. 2 depicts a simplified example of wireless communication network 30 according to one or more embodiments. As shown, the network 30 includes a Radio Access Network (RAN) 32, a Core Network (CN) 34, and one or more user equipment (UE) 36. The RAN 32 and CN 34 enable a UE 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. As shown, for example, base station 40-1 serves UEs 36 within cell 42-1, base station 40-2 serves UEs 36 within cell 42-2, and so on. Because of this, a UE 36 may move within or between cells 42 and may communicate with one or more base stations 40 at any given position.

Figure 5:
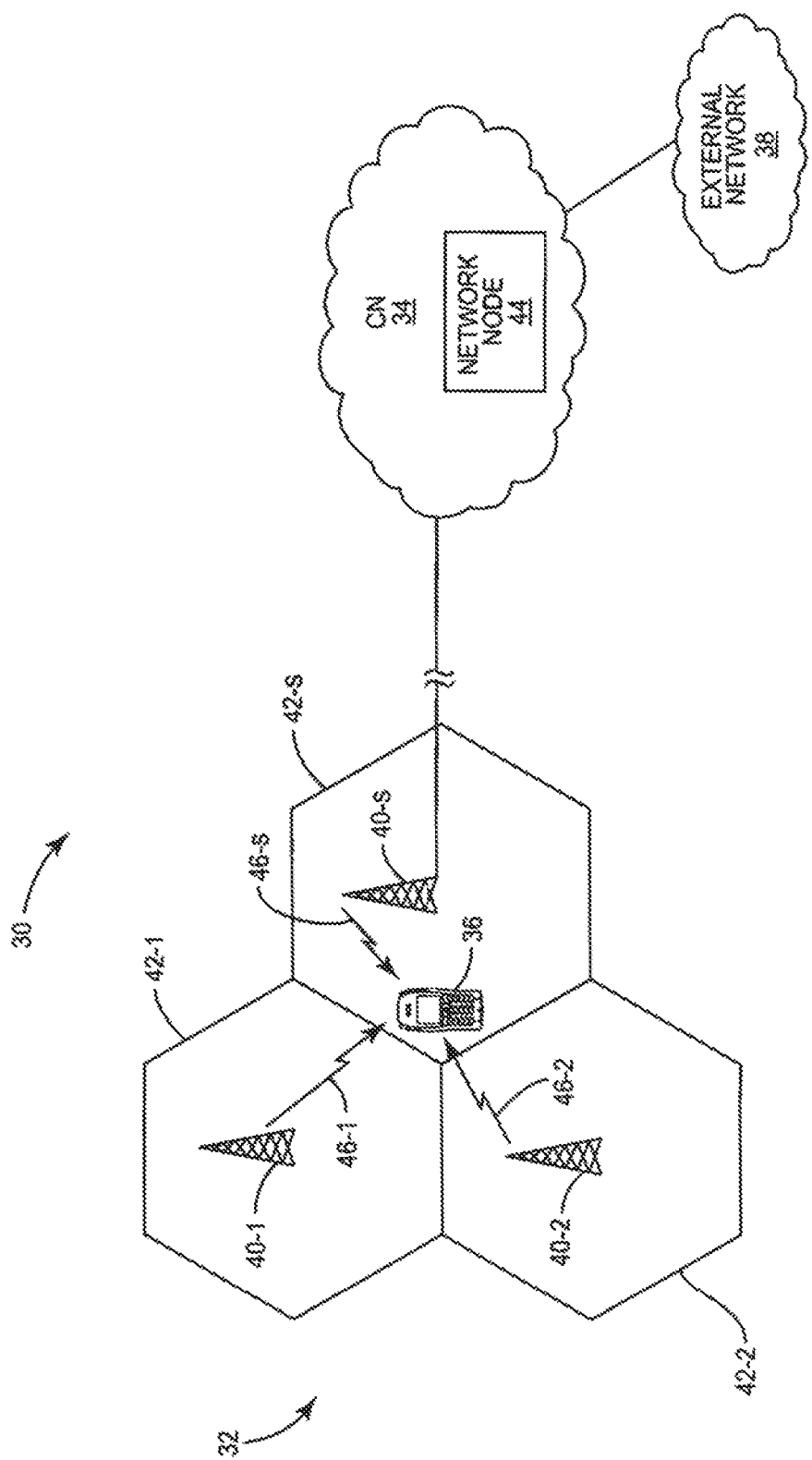
FIG. 5 is a block diagram of a wireless communication network that includes a network node and a user equipment configured according to one or more embodiments.

In this regard, FIG. 5 depicts a particular UE 36 that, at its current position, is served by base station 40-*s*. Thus, from the perspective of this UE 36, base station 40-*s* is the serving base station and cell 42-*s* is the serving cell. The other cells 42-1 and 42-2 physically neighbor the serving cell 42-*s* in the sense that they are geographically adjacent to the serving cell 42-*s*. These cells 42-1 and 42-2 are thus appropriately referred to as neighboring cells.

Each of the cells 42 (via its base station 40) periodically transmits positioning signals 46 during respective positioning occasions of those cells 42. A positioning signal 46 as used herein is specifically designed (e.g., with good signal quality) to be a signal on which a UE performs positioning measurements. And a positioning occasion of a cell 42 as used herein refers a periodic interval of time during which that cell transmits a positioning signal for measurement by a UE 36. Such measurements are to be used by the UE 36 itself, or some other network node 44 in the core network 35 (e.g., a positioning node), for determining the UE's geographic position.

In some embodiments, for example, such positioning measurements comprise timing measurements. In such a case, a UE may measure timing differences (e.g., RSTD, Rx-Tx, or TA) between different positioning signals 46 received from different cells 42. These timing differences are then used to estimate the UE's position with respect to the different cells 42.

Regardless of the particular type of positioning measurements, though, one of the cells 42 serves as a so-called reference cell for the UE's measurements. Positioning measurements performed with respect to this reference cell, as the name implies, serves as a reference for measurements performed with respect to other cells 42. For instance, where the positioning measurements are timing measurements, the UE 36 measures the difference between the time at which the UE 36 receives a positioning signal from the reference cell and the time at which the UE 36 receives a positioning signal from another cell 42. Any cell 42 may serve as the reference cell, including any one of the neighbor cells 42-1 and 42-2 or the serving cell 42-s.

To help the UE 36 perform these positioning measurements, the network node 44 transmits so-called assistance data to the UE 36. This assistance data indicates the positioning occasion timing for the cells 42 on which the UE 36 is to perform the positioning measurements. With knowledge of this positioning occasion timing, the UE 36 can time its measurement of each cell 42 to coincide with the times at which the cell 42 actually transmits its positioning signals 46.

Further contributing to the role played by the reference cell, the assistance data more particularly indicates the positioning occasion timing for any given cell 42 relative to the positioning occasion timing for the reference cell. For example, the assistance data may indicate when a positioning occasion of a particular cell is to occur as a timing offset from when a positioning occasion of the reference cell is to occur.

While indicating positioning occasion timing relative to the reference cell in this way proves efficient, it adds complexities in some contexts. Consider, for example, the context shown in FIG. 6, wherein the positioning occasion periodicity of the reference cell ($T_{prs\_ref}$=160 ms) is smaller than that of a neighbor cell 42 ($T_{prs\_neigh}$=320 ms) indicated in the assistance data. If the network node 44 were to generate the assistance data at time T0, the node 44 would calculate that the timing offset between the next positioning occasion of the reference cell (occasion B, starting at time T1) and the next positioning occasion of the neighbor cell (occasion E, starting at time T3) has a value of offset=T1−T3. Yet, if the UE 36 does not receive the assistance data until after time T1, the UE 36 could reasonably interpret the received timing offset as being an offset from reference cell positioning occasion C that starts at time T2, rather than T1, because from the UE's perspective the next positioning occasion of the reference cell starts at time T2. In this case, the UE 36 would incorrectly determine that the next positioning occasion E of the neighbor cell starts at time T2+offset=T5, rather than at time T1+offset=T3.

One or more embodiments herein, however, advantageously eliminate or at least mitigate this timing ambiguity. Broadly described, the network node 44 times its transmission of assistance data to the UE 36 in a way that enables the node 44 to be certain about between which two positioning occasions of the reference cell the UE 36 will receive the data. This in turn enables the UE 36 to be certain about which positioning occasion of the reference cell the network node 44 calculated a received timing offset relative to.

Figure 7:
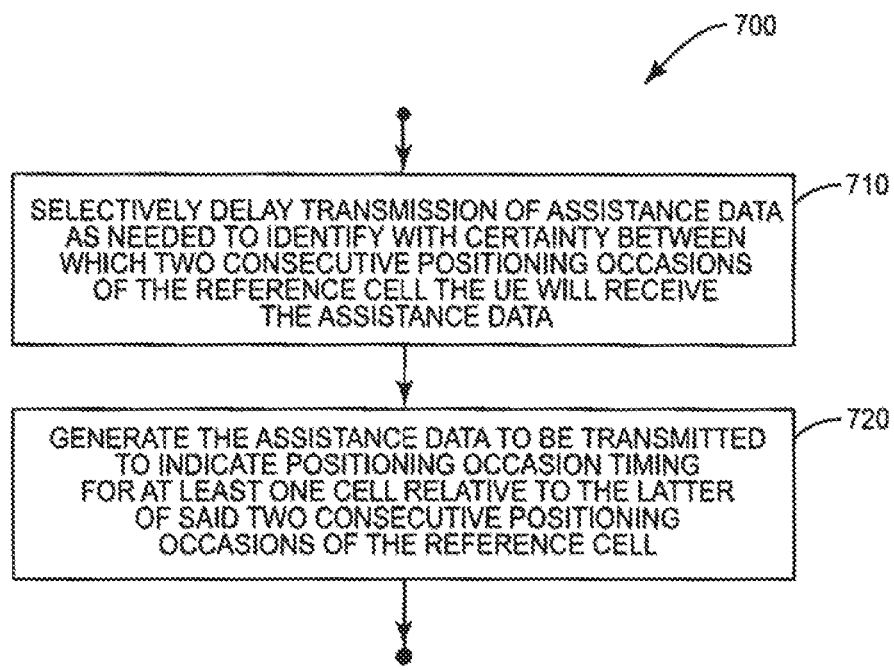
FIG. 7 is a logic flow diagram of a method implemented by a network node for assisting a user equipment to perform positioning measurements, according to one or more embodiments.

FIG. 7 illustrates processing performed by the network node 44 in this regard, for assisting the UE 36 to perform positioning measurements. As shown in FIG. 7, processing 700 at the network node 44 includes selectively delaying transmission of assistance data to the UE 36 as needed, based on defined uncertainty in one or more timing parameters, for the network node 44 to identify with certainty between which two consecutive positioning occasions of the reference cell the UE 36 will receive that assistance data (Block 710). Processing 700 further includes generating the assistance data to be transmitted to indicate positioning occasion timing for at least one cell 42 relative to the latter of those two consecutive positioning occasions of the reference cell (Block 720).

The defined uncertainty on which the network node 44 bases this selective delay may represent, for example, uncertainty in the local time at the network node 44, uncertainty in the message processing delay at the network node 44, uncertainty in the signaling delay between the network node 44 and the UE 36, uncertainty in the frame timing of the cells 42 at issue, or any combination thereof. Regardless, in performing the above processing, the network node 44 effectively acknowledges that this defined uncertainty compromises its ability to identify between which two positioning occasions of the reference cell the UE 36 will receive the assistance data. The network node 44 thereby takes into account the defined uncertainty by refraining from transmitting the assistance data if the defined uncertainty in the timing parameters is rendering the node 44 uncertain about the identity of the reference cell positioning occasions between which the UE 36 will receive the assistance data. When the defined uncertainty in the timing parameters no longer renders the node 44 uncertain in this regard, the node 44 transmits the assistance data.

In at least some embodiments, therefore, the network node 44 iteratively evaluates whether current transmission of the assistance data would permit the network node 44 to identify the reference cell positioning occasions between which the UE 36 will receive the assistance data, while account for the defined uncertainty. If current transmission would not permit such identification, according to the defined uncertainty, the network node 44 refrains from transmitting the assistance data and repeats the inquiry at a later time. But, if current transmission would permit the identification, the network node 44 transmits the assistance data at that time.

In other embodiments, the network node 44 utilizes the defined uncertainty to compute different time windows during which the identification (and therefore assistance data transmission) is permissible. FIG. 8 provides an illustrative example as an extension of the example in FIG. 6. As shown in FIG. 8, the network node 44 computes a time window X. The node 44 does so by determining that, if the node 44 were to transmit the assistance data during this time window X, the node 44 would be able to identify with certainty that the UE 36 will receive the assistance data between reference cell positioning occasions A and B. If, after computing time window X, the node 44 recognizes that the time window X has already passed, the network node 44 delays the assistance data transmission until another time window Y. The node 44 computes time window Y by determining that, if the node 44 were to transmit the assistance data during this time window Y, the node 44 would be able to identify with certainty that the UE 36 will receive the assistance data between reference cell positioning occasions B and C.

Notably, the node 44 computes the time windows X and Y so that they exclude a time interval Z therebetween. Indeed, the defined uncertainty in the one or more timing parameters renders the node 44 uncertain about whether assistance data transmitted during this interval Z would be received by the UE 36 between positioning occasions A and B, or between positioning occasions B and C. So, by excluding time interval Z from the time windows X, Y, the node 44 refrains from transmitting assistance data during that time of uncertainty.

As shown in FIG. 8, the network node 44 in some embodiments computes time window X as a window of time between the start of positioning occasions A and B that has been shortened at both ends by the defined uncertainty $T_{un}$. Likewise, the network node 44 computes time window Y as a window of time between the start of positioning occasions B and C that has been shortened at both ends by the defined uncertainty $T_{un}$. In doing so, the node 44 effectively acknowledges that, by refraining from transmitting the assistance data near a positioning occasion start time, the node 44 can be more certain about between which two positioning occasions the assistance data will be received. Accordingly, the more conservatively estimated the defined uncertainty $T_{un}$, the higher the threshold level of certainty required for the network node's identification before transmitting the assistance data.

As shown briefly in FIG. 9, the network node 44 may also compute the time windows X, Y as a function of a defined signaling delay $T_{delay}$ between the network node 44 and the UE 36. In some embodiments, for example, the network node 44 computes time window X as a window of time between the start of positioning occasions A and B that has not only been shortened at both ends by the defined uncertainty $T_{un}$, but that has also been shifted by the defined signaling delay $T_{delay}$. The network node 44 computes time window Y in an analogous manner. In doing so, the network node 44 effectively acknowledges that if the node 44 transmits the assistance data when there is $T_{delay}$ or less time before the start of the next positioning occasion, the UE 36 will not receive the data until after that occasion's start.

Figure 6:
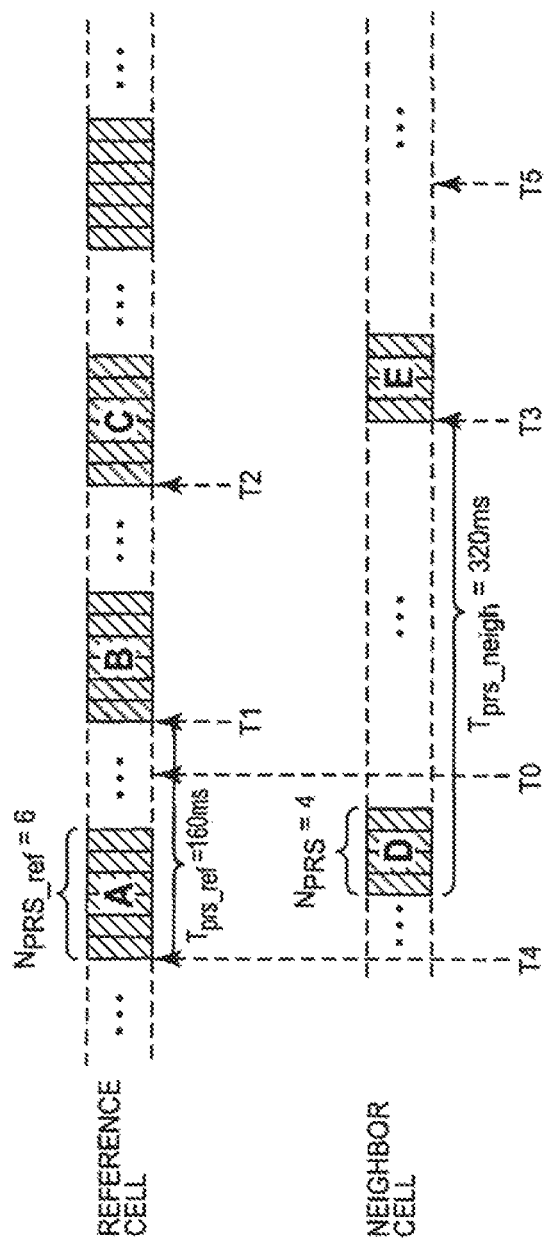
FIG. 6 illustrates positioning occasion timing of a reference cell and a neighbor cell according to one example.

Describing these embodiments in quantitative form, with reference to FIGS. 6 and 9, the network node 44 may compute time window X as being an interval between time $T4+T_{un}-T_{delay}$ and time $T1-T_{un}-T_{delay}$. Of course, if the defined uncertainty $T_{un}$ is large enough (i.e., $2T_{un}>T1-T4$), $T4+T_{un}-T_{delay}$ will be greater than $T1-T_{un}-T_{delay}$. In this case, time window X really includes no time at all, meaning that there is not any window of time during which the network node 44 could transmit the assistance data and confidently identify the reference cell positioning occasions between which the UE 36 would receive that data. The network node 44 may therefore abort the assistance data transmission process.

Also describing the defined uncertainty $T_{un}$ in qualitative form, this uncertainty may represent the uncertainty in a number of timing parameters. In at least one embodiment, for instance, the defined uncertainty $T_{un}$ is equal to:

$$T_{un}=T_{un\_smlc}+T_{un\_ref}+T_{un\_neigh}+T_{un\_delay}+T_{un\_lpp} \quad (1)$$

where $T_{un\_smlc}$ is the uncertainty of the network node's local time (normally on the order of milliseconds), $T_{un\_ref}$ is the uncertainty of the frame timing in the reference cell (normally on the order of sub-microseconds), $T_{un\_neigh}$ is the uncertainty of the frame timing in neighbor cells (normally on the order of sub-microseconds), $T_{un\_delay}$ is the uncertainty of the defined signaling delay $T_{delay}$ (normally between 10-15 ms and $T_{un\_lpp}$ is the uncertainty of LPP message processing delay at the network node in LTE embodiments. Of course, other embodiments may include additional parameters of uncertainty as well.

Regardless of the particular manner in which the network node 44 calculates the time windows X, Y, the node 44 in some embodiments generates the assistance data to indicate different positioning occasion timing for the neighbor cell depending on the time window in which the assistance data is to be transmitted. Referring back to FIG. 8, for example, if the node 44 computes time window X and determines that the current time is within time window X, it decides to transmit the assistance data to the UE 36 during that window. Once it makes this decision, the node 44 generates the assistance data to indicate positioning occasion timing for the neighbor cell relative to reference cell positioning occasion B. Specifically, the node 44 computes the timing offset included in the assistance data to be T1-T3. The node 44 does so based on knowledge that reference cell positioning occasion B will be the next reference cell positioning occasion from the UE's perspective, at the moment the UE 36 receives the assistance data.

On the other hand, if the node 44 determines that the window X has passed, it decides to delay assistance data transmission until time window Y. The node 44 then generates the assistance data to indicate positioning occasion timing for the neighbor cell relative to reference cell positioning occasion C. Specifically, the node 44 computes the timing offset included in the assistance data to be T2-T3. The node 44 does so based on knowledge that reference cell positioning occasion C will be the next reference cell positioning occasion from the UE's perspective, at the moment the UE 36 receives the assistance data.

Figure 10:
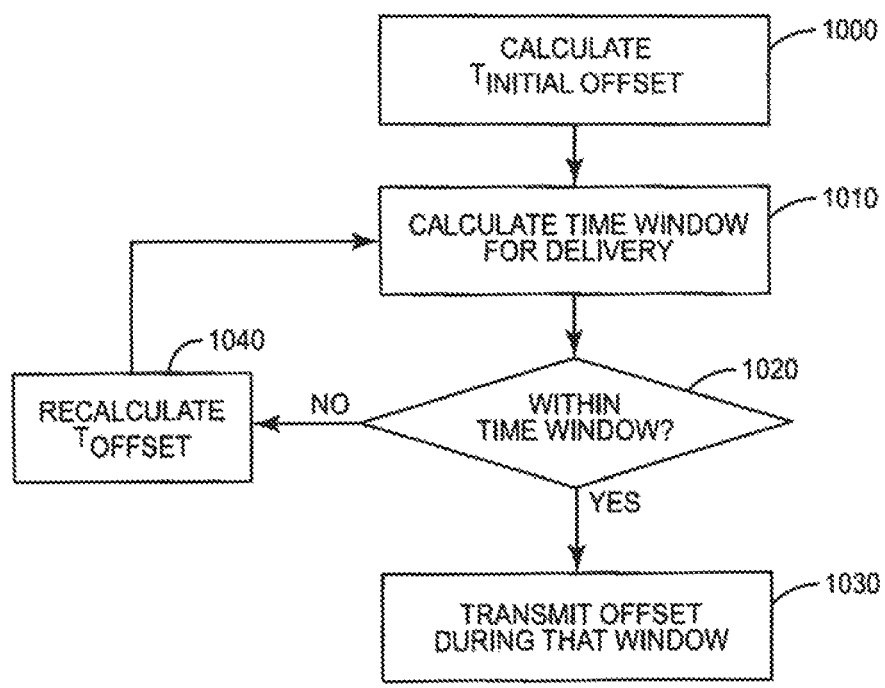
FIG. 10 is a logic flow diagram of a network node's iterative evaluation of whether or not to transmit assistance data according to one or more embodiments.

In other embodiments shown in FIG. 10, by contrast, the network node 44 computes a timing offset and then computes the time window in which that offset can be transmitted, rather than computing the time window first and then determining the offset to be transmitted in that window. Consider the example where the network node 44 first begins to generate the assistance data at time T0. At this time, the node 44 first calculates the timing offset ($T_{offset}$) as $T_{offset}=T1-T3$, where this initially calculated timing offset will be referred to for convenience as $T_{initialOffset}$ (Block 1000 in FIG. 10). The node 44 then calculates the time window X in which this timing offset must be transmitted to the UE 36 as assistance data (Block 1010). If the time window X has not already passed ('Yes' at Block 1020), the node 44 sends the assistance data during that window (Block 1030).

But, if the time window X has already passed ('No' at Block 1020), the node 44 re-calculates the timing offset as:

$$T_{offset}=\mod(T_{initialOffset}-K*T_{prs\_ref}T_{prs\_neigh}) \quad (2)$$

where mod(x,y) is the math operator x modulo y, and where K is a non-negative integer and represents the number of reference cell positioning occasions to delay assistance data transmission (Block 1040). Where K=1 in the simple example of FIGS. 6 and 9, the re-calculated timing offset $T_{offset}$ is T2-T3. The node 44 next calculates the time window in which this timing offset must be transmitted to the UE 36 as assistance data (Block 1010). Again, where K=1, the time window in the provided example will be time window Y. In at least some embodiments, the node 44 re-calculates the timing offset $T_{offset}$ immediately after recognizing that the first time window X has already passed, meaning that the next calculated time window Y will necessarily not have yet passed. In general, though, the node 44 may re-calculate the timing offset $T_{offset}$ at any time. Regardless, the network node 44 continues this process iteratively, as needed, to transmit a timing offset $T_{offset}$ to the UE 36 during a time window in which it can identify with certainty between which reference cell positioning occasions the UE 36 will receive that offset (Block 1030). Based on this rather specific example, therefore, one skilled in the art will appreciate that if the calculated window (e.g., window X between time $T4+T_{un}-T_{delay}$ and time $T1-T_{un}-T_{delay}$) does not cover the current time, then the node 44 has the option to use a subsequent timing offset (defined by equation (2), for example T2-T3) as the timing offset $T_{offset}$ and deliver the corresponding offset parameters during the next time windows.

Figure 11:
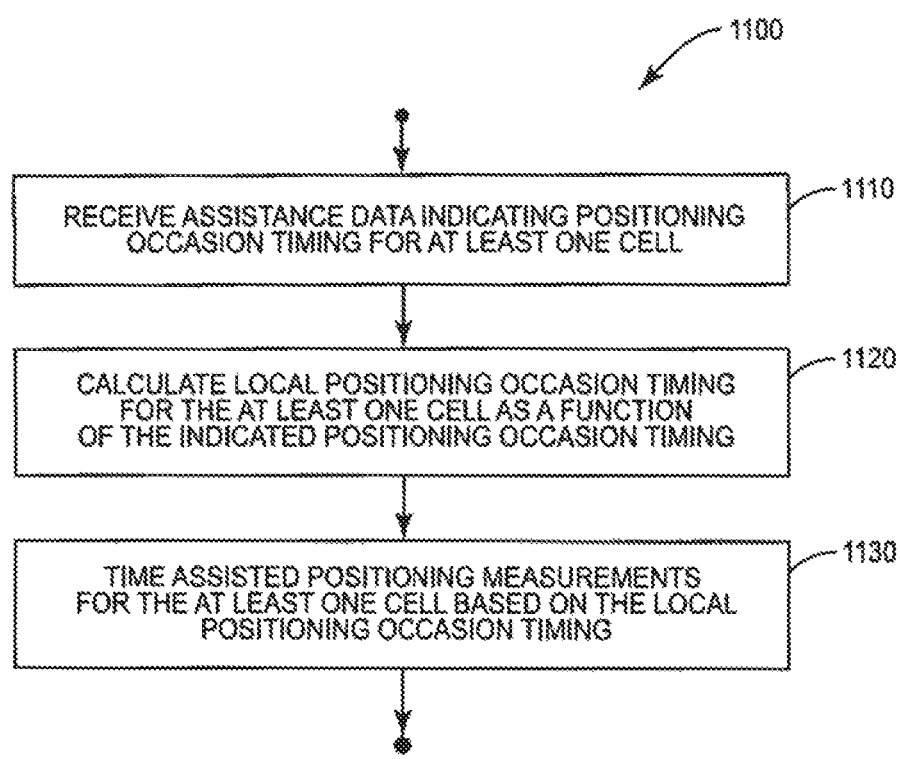
FIG. 11 is a logic flow diagram of a method implemented by a user equipment for performing assisted positioning measurements according to one or more embodiments.

Correspondingly, when the UE 36 receives the assistance data, the UE 36 performs the processing 1100 shown in FIG. 11 for performing assisted positioning measurements. As shown in FIG. 11, processing 1100 includes receiving assistance data from the network node 44 that indicates positioning occasion timing for at least one cell 42 relative to the next positioning occasion of the reference cell that it is to occur after such reception (Block 1110). Indeed, because of the way that the network node 44 calculated and transmitted the assistance data, the UE 36 can be certain that the next reference cell positioning occasion occurring after its reception of the assistance data is the reference cell positioning occasion on which the assistance data is based. Processing then includes calculating local positioning occasion timing for that at least one cell 42 as a function of the positioning occasion timing indicated for that cell (Block 1120). Such local positioning occasion timing is relative to the first reference cell positioning occasion at which the UE is to begin positioning measurements, rather than being relative to the next reference cell positioning occasion occurring after assistance data reception, Finally, processing includes timing assisted positioning measurements for the at least one cell 42 based on the local positioning occasion timing calculated for that cell 42 (Block 1130).

In some embodiments, for example, the UE 36 calculates the local positioning occasion timing ($T_{localOffset}$) by subtracting a time difference ($\Delta$offset) from the positioning occasion timing indicated in the assistance data ($T_{offset}$)—i.e., $T_{localOffset} = T_{offset} - \Delta\text{offset}$, or more generally $T_{locolOffset} = \text{mod}(T_{offset} - \Delta\text{offset}, T_{prs\_neigh})$. This time difference $\Delta$offset represents the difference between the start of the next reference cell positioning occasion and the start of the first reference cell positioning occasion at which the UE 36 is to begin positioning measurements.

In at least one embodiment, the UE 36 computes this time difference $\Delta$offset as a function of a receipt timestamp $T_{UE}$ defined as the time at which the UE 36 received the assistance data, a measurement start time delay $T_{\Delta UE}$ defined as the amount of time from the receipt timestamp $T_{UE}$ before the UE 36 is to start positioning measurements, and the positioning occasion periodicity of the reference cell $T_{prs\_ref}$. More specially, the UE 36 computes $\Delta$offset as:

$$\Delta\text{offset} = T_{prs\_ref} * \text{fix}(T_{\Delta UE} - (T1_{UE} - T_{UE})/T_{prs\_ref}), \quad (3)$$

where the function fix(y) rounds y down towards zero, and $T1_{UE}$ represents the start of the next reference cell positioning occasion, in terms of the UE's local time, at the moment that the assistance data is received. As understood from this expression, the time difference $\Delta$offset will be an integer multiple of the reference cell positioning occasion periodicity $T_{prs\_ref}$.

Figure 12:
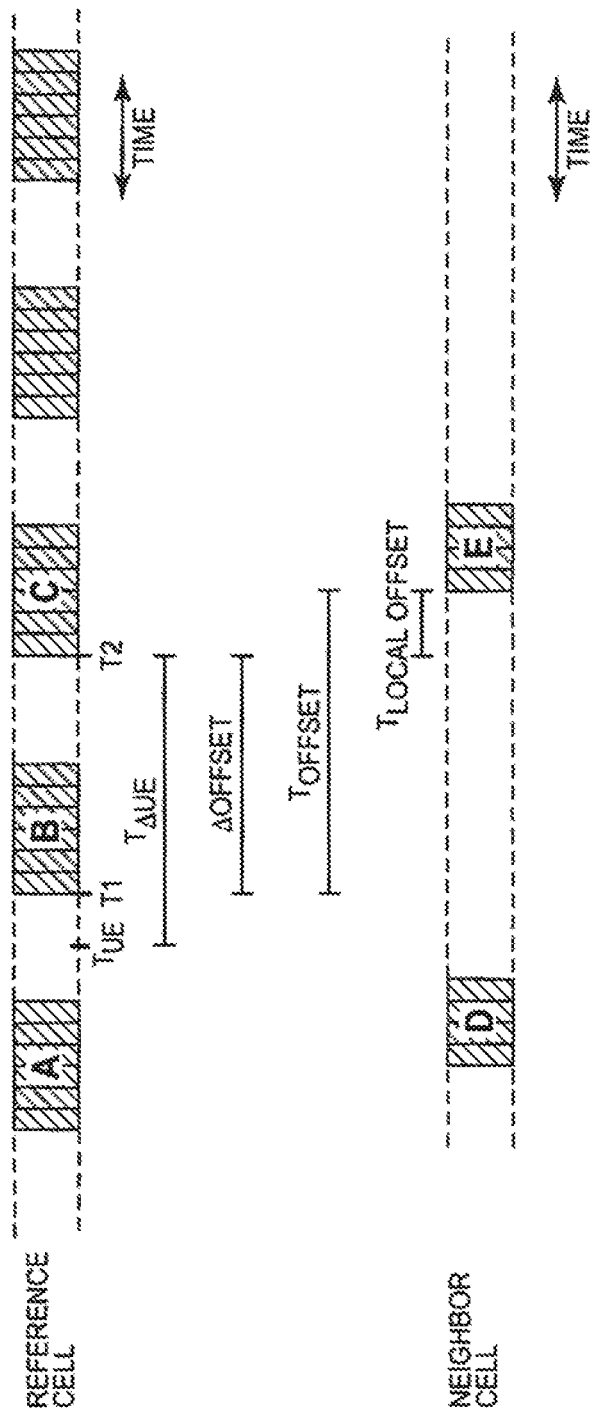
FIG. 12 is an example that illustrates a user equipment's calculation of a local positioning occasion timing offset according to one or more embodiments.

Consider, for instance, a continuation of the above examples as shown in FIG. 12. In FIG. 12, the UE 36 receives the assistance data shortly before reference cell positioning occasion B, at time $T_{UE}$. The assistance data indicates $T_{offset} = T1 - T3$. The UE 36 records this time of receipt $T_{UE}$ because the UE 36 will not start positioning measurements until the start of reference cell positioning occasion C, one positioning occasion later at time T2 (i.e., the measurement start time delay $T_{\Delta UE}$ is equal to $T2 - T_{UE}$). According to equation (3) above, the time difference $\Delta$offset between the start of reference cell positioning occasion B and the start of reference cell positioning occasion C, is simply the reference cell positioning occasion periodicity $T_{prs\_ref}$ (i.e., $\Delta\text{offset} = T_{prs\_ref}$). Thus, with $T_{localOffset} = T_{offset} - \Delta\text{offset}$, the UE 36 calculates the local positioning occasion timing for the neighbor cell to be $(T1-T3) - T_{prs\_ref}$, which in this example is T2-T3.

Of course, those skilled in the art will readily appreciate that the examples herein have been simplified in a number of respects for purposes of illustration. Indeed, while the primary example herein illustrated a reference cell positioning occasion periodicity that was twice as small as the positioning occasion periodicity of another cell, such need not be the case. In at least some embodiments, for example, those periodicities may each be either 160 ms, 320 ms, 640 ms, or 1280 ms. Nonetheless, in some embodiments, the above processing at the network node 44 and UE 36 may be conditioned on the reference cell positioning occasion periodicity being smaller than the positioning occasion periodicity of at least one other cell included in the assistance data. In this regard, the network node 44 may deliver assistance data separately for cells that have a larger positioning occasion periodicity than the reference cell and cells that have a smaller positioning occasion periodicity than the reference cell, and perform the above processing only for assistance data delivery of the former.

Those skilled in the art will also appreciate that the network node 44 may need to acquire values for one or other parameters not mentioned thus far to carry out the above processing. The network node 44 may acquire, for instance, local information about the precise timing and positioning signal configuration of the different cells 42. Such timing may include, for example, the timing of system frame number 0. The network node 44 may further acquire a local time reference via the NTP protocol or a GPS receiver, but the precision of the network node's dock is normally no worse than plus or minus 50 ms.

Still further, those skilled in the art will understand that the above mentioned positioning signals may be transmitted on the same or different frequencies across the cells 42. That is, the signals may be inter-frequency or intra-frequency. The above embodiments may therefore be implemented by UEs that need measurement gaps to perform positioning measurements on inter-frequency signals, as well as by UEs that do not need such gaps. Indeed, standardized operation of a UE 36 may dictate that measurement gaps be configured for such positioning measurements, even if the UE 36 is technically capable of performing the measurements without them. One such UE 36 may be, for instance, a device capable of carrier aggregation.

Those skilled in the art will further appreciate that the UE 36 described herein may be any wireless node capable of performing positioning measurements on positioning signals 46. In this regard, the UE 36 may be a mobile terminal (e.g., a smart phone, a personal digital assistant, a laptop, etc.), a sensor, a mobile relay, or even a small base station or fixed relay that is being positioned, e.g., at setup. In LTE embodiments, for instance, the UE 36 comprises any LCS target.

Moreover, the above embodiments have not been described in the context of any particular type of wireless communication system (i.e., RAT). In this regard, no particular communication interface standard is necessary for practicing the present invention. That is, the wireless communication network 30 may be any one of a number of standardized system implementations in which a UE 36 can perform positioning measurements.

Nonetheless, as one particular example, the network 30 may implement LTE or LTE-based standards. In this case, the network node 44 may comprise a positioning node that implements a positioning platform. If the platform is implemented in the user plane, the network node 44 is an SLP node, and if the platform is implemented in the control plane, the node 44 is an E-SMLC node. Moreover, signaling of the positioning result between an E-SMLC node and an LCS Client may be transferred via multiple nodes (e.g., via MME and GMLC). Note also that LTE FDD and LTE TDD are considered as different RATs, and two LTE networks are also considered as two different LTE RATs. Finally, positioning signals 46 as referred to above comprise Positioning Reference Signals (PRS) in LTE.

Further, those skilled in the art will appreciate that various terms herein may be used interchangeably to refer to the periodicity with which positioning signals 46 are transmitted. Such terms may include, for instance, positioning signal periodicity, positioning occasion periodicity, cell-specific subframe configuration period, PRS periodicity, cell-specific positioning subframe configuration period, or the like.

Finally, the above embodiments may employ any number of positioning method types besides those examples given above. The measurements may include, for instance, Reference Signal Time Difference (RSTD) measurements for Observed Time Difference of Arrival (OTDOA) positioning. However, other types of timing measurements are just as applicable.

Figure 13:
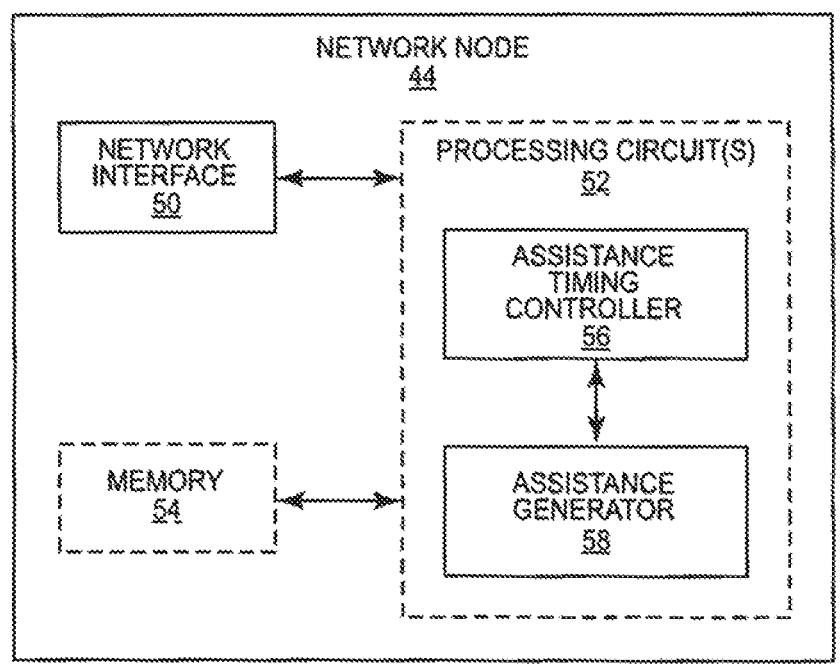
FIG. 13 is a block diagram of a network node configured according to one or more embodiments.

In view of the above described variations and modifications, those skilled in the art will appreciate that the network node 44 herein generally is configured according to the apparatus shown in FIG. 13. As shown in FIG. 13, the network node 44 includes one or more network interfaces 50, one or more processing circuits 52, and a memory 54. The one or more network interfaces 50 are configured to communicatively couple the network node 44 to the UE 36, via one or more intermediate nodes such as base stations 40. The one or more processing circuits 52 further include an assistance timing controller 56 and an assistance generator 58.

The assistance timing controller 56 is configured to selectively delay transmission of assistance data to the UE 36 as needed, based on defined uncertainty in one or more timing parameters, for the network node 44 to identify with certainty between which two consecutive positioning occasions of a reference cell the UE 36 will receive that assistance data. Correspondingly, the assistance generator 58 is configured to generate the assistance data to be transmitted to indicate positioning occasion timing for at least one cell 42 relative to the latter of those two consecutive positioning occasions of the reference cell.

Figure 14:
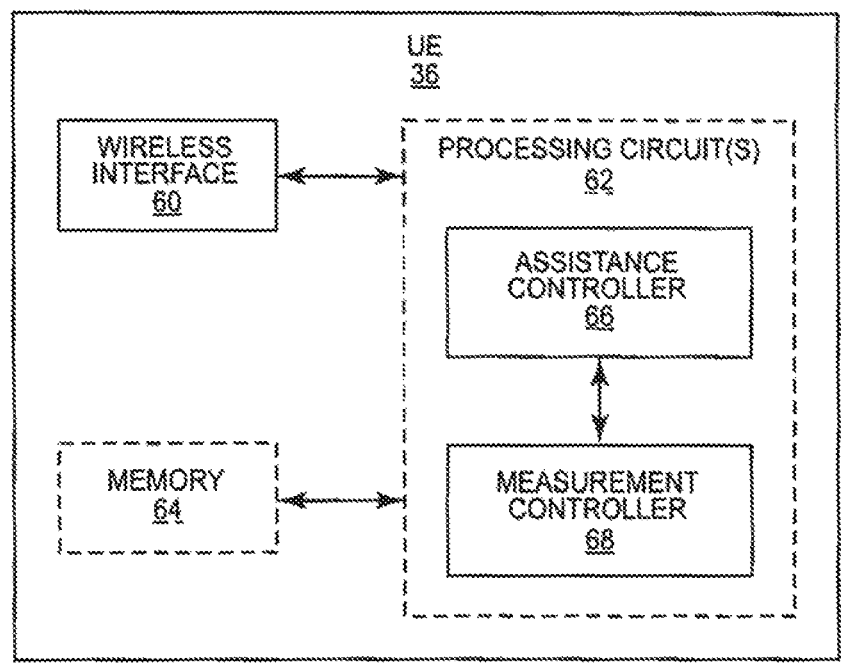
FIG. 14 is a block diagram of a user equipment configured according to one or more embodiments.

Those skilled in the art will further appreciate that the UE 36 herein is generally configured according to the apparatus shown in FIG. 14. The UE 36 includes a wireless interface 60, one or more processing circuits 62, and a memory 64. The wireless interface is configured to wireless communicate with one or more base stations 40 over an air interface, for ultimately communicating with the network node 44. The one or more processing circuits 62 include an assistance controller 66 and a measurement controller 68.

The assistance controller 66 is configured to receive from the network node 44 assistance data that indicates positioning occasion timing for at least one cell relative to the next positioning occasion of the reference cell that is to occur after such reception. The assistance controller 66 is further configured to calculate local positioning occasion timing for the at least one cell as a function of the positioning occasion timing indicated for that cell. This local positioning occasion timing is relative to the first positioning occasion of the reference cell at which the UE 36 is to begin positioning measurements. Finally, the measurement controller 68 is configured to time assisted positioning measurements for the at least one cell based on the local positioning occasion timing calculated for that cell.

Of course, those skilled in the art will appreciate that the various "circuits" described may refer to a combination of analog and digital circuits, and/or one or more processors configured with software stored in memory 54, 64 and/or firmware stored in memory 54, 64 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended in be embraced therein.

What is claimed is:

1. A method implemented by a network node in a wireless communication network for assisting a user equipment to perform positioning measurements on positioning signals periodically transmitted by one or more cells during respective positioning occasions of those cells, the method comprising:

delaying transmission of assistance data to the user equipment as needed, based on defined uncertainty in one or more timing parameters, for the network node to identify with certainty between which two consecutive positioning occasions of a reference cell the user equipment will receive that assistance data; and generating the assistance data to be transmitted to indicate positioning occasion timing for at least one cell relative to the latter of said two consecutive positioning occasions of the reference cell.

2. The method of claim 1, wherein said delaying comprises iteratively evaluating whether current transmission of assistance data permits said identification while accounting for said defined uncertainty.

3. The method of claim 1, wherein said delaying comprises, if a first time window for said transmission that would have permitted said identification with respect to first and second consecutive positioning occasions of the reference cell has already passed, delaying said transmission until a second time window that will permit said identification with respect to second and third consecutive positioning occasions of the reference cell.

4. The method of claim 3, wherein said delaying further comprises computing said first and second time windows as a function of said defined uncertainty and a defined signaling delay between the network node and the user equipment.

5. The method of claim 4, wherein said computing comprises computing said first and second time windows as windows of time between the start of said first and second consecutive positioning occasions, and the start of said second and third consecutive positioning occasions, respectively, that have been shortened at both ends by said defined uncertainty and shifted by said defined signaling delay.

6. The method of claim 3, wherein said generating comprises:

if the assistance data is transmitted during the first time window, generating the assistance data to indicate positioning occasion timing for said at least one cell relative to the second consecutive positioning occasion of the reference cell; and if the assistance data is transmitted during the second time window, generating the assistance data to indicate positioning occasion timing for said at least one cell relative to the third consecutive positioning occasion of the reference cell.

7. The method of claim 1, wherein said defined uncertainty represents the combined uncertainty in one or more timing parameters that include one or more of:

a local time at the network node;

message processing delay at the network node;

frame timing of the reference cell;

frame timing of the at least one cell; and a defined signaling delay between the network node and the user equipment.

8. The method of claim 1, wherein said delaying and said generating are performed responsive to determining that a positioning occasion periodicity of the reference cell is smaller than a positioning occasion periodicity of at least one of said cells.

9. The method of claim 1, wherein said positioning measurements comprise Reference Signal Time Difference (RSTD) measurements for Observed Time Difference of Arrival (OTDOA) positioning.

10. The method of claim 1, wherein the wireless communication network comprises a Long Term Evolution (LTE) network, wherein the positioning signals comprise Positioning Reference Signals (PRS), and wherein the network node is an Evolved Serving Mobile Location Center.

11. A method implemented by a user equipment in a wireless communication network for performing assisted positioning measurements on positioning signals periodically transmitted by one or more cells during respective positioning occasions of those cells, the method comprising:
  receiving from a network node assistance data that indicates positioning occasion timing for at least one cell relative to the next positioning occasion of a reference cell that is to occur after said reception;
  calculating local positioning occasion timing for said at least one cell as a function of the positioning occasion timing indicated for that cell, said local positioning occasion timing being relative to the first positioning occasion of the reference cell at which the user equipment is to begin said positioning measurements; and
  timing assisted positioning measurements for said at least one cell based on the local positioning occasion timing calculated for that cell.

12. The method of claim 11, wherein said calculating comprises calculating local positioning occasion timing for said at least one cell by subtracting from the positioning occasion timing indicated for that cell any time difference between the start of the next positioning occasion of the reference cell and the start of the first positioning occasion of the reference cell at which the user equipment is to begin said positioning measurements.

13. The method of claim 12, further comprising calculating said time difference as a function of a receipt timestamp defined as the time at which the user equipment received said assistance data, a measurement start time delay defined relative to said receipt timestamp, and a positioning occasion periodicity of the reference cell.

14. The method of claim 11, wherein said positioning measurements comprise Reference Signal Time Difference (RSTD) measurements for Observed Time Difference of Arrival (OTDOA) positioning.

15. The method of claim 11, wherein the wireless communication network comprises a Long Term Evolution (LTE) network, wherein the positioning signals comprise Positioning Reference Signals (PRS), and wherein the network node is an Evolved Serving Mobile Location Center.

16. A network node in a wireless communication network configured to assist a user equipment to perform positioning measurements on positioning signals periodically transmitted by one or more cells during respective positioning occasions of those cells, the network node comprising:
  a network interface configured to communicatively couple the network node to the user equipment; and
  one or more processing circuits configured to:
    delay transmission of assistance data to the user equipment as needed, based on defined uncertainty in one or more timing parameters, for the network node to identify with certainty between which two consecutive positioning occasions of a reference cell the user equipment will receive that assistance data; and
    generate the assistance data to be transmitted to indicate positioning occasion timing for at least one cell relative to the latter of said two consecutive positioning occasions of the reference cell.

17. The network node of claim 16, wherein the one or more processing circuits are configured to iteratively evaluate whether current transmission of assistance data permits said identification while accounting for said defined uncertainty.

18. The network node of claim 16, wherein the one or more processing circuits are configured, if a first time window for said transmission that would have permitted said identification with respect to first and second consecutive positioning occasions of the reference cell has already passed, to delay said transmission until a second time window that will permit said identification with respect to second and third consecutive positioning occasions of the reference cell.

19. The network node of claim 18, wherein the one or more processing circuits are configured to compute said first and second time windows as a function of said defined uncertainty and a defined signaling delay between the network node and the user equipment.

20. The network node of claim 19, wherein the one or more processing circuits are configured to compute said first and second time windows as windows of time between the start of said first and second consecutive positioning occasions, and the start of said second and third consecutive positioning occasions, respectively, that have been shortened at both ends by said defined uncertainty and shifted by said defined signaling delay.

21. The network node of claim 18, wherein the one or more processing circuits are configured to:
  if the assistance data is transmitted during the first time window, generate the assistance data to indicate positioning occasion timing for said at least one cell relative to the second consecutive positioning occasion of the reference cell; and
  if the assistance data is transmitted during the second time window, generate the assistance data to indicate positioning occasion timing for said at least one cell relative to the third consecutive positioning occasion of the reference cell.

22. The network node of claim 16, wherein said defined uncertainty represents the combined uncertainty in one or more timing parameters that include one or more of:
  a local time at the network node;
  message processing delay at the network node;
  frame timing of the reference cell;
  frame timing of the at least one cell; and
  a defined signaling delay between the network node and the user equipment.

23. The network node of claim 16, wherein said positioning measurements comprise Reference Signal Time Difference (RSTD) measurements for Observed Time Difference of Arrival (OTDOA) positioning.

24. The network node of claim 16, wherein the wireless communication network comprises a Long Term Evolution (LTE) network, wherein the positioning signals comprise Positioning Reference Signals (PRS), and wherein the network node is an Evolved Serving Mobile Location Center.

25. A user equipment in a wireless communication network configured to perform assisted positioning measurements on positioning signals periodically transmitted by one or more cells during respective positioning occasions of those cells, the user equipment comprising:

a wireless interface configured to communicatively couple the user equipment to the wireless communication network; and one or more processing circuits configured to:

receive from a network node, via the wireless interface, assistance data that indicates positioning occasion timing for at least one cell relative to the next positioning occasion of a reference cell that is to occur after said reception;

calculate local positioning occasion timing for said at least one cell as a function of the positioning occasion timing indicated for that cell, said local positioning occasion timing being relative to the first positioning occasion of the reference cell at which the user equipment is to begin said positioning measurements; and time assisted positioning measurements for said at least one cell based on the local positioning occasion timing calculated for that cell.

26. The user equipment of claim 25, wherein the one or more processing circuits are configured to calculate local positioning occasion timing for said at least one cell by subtracting from the positioning occasion timing indicated for that cell any time difference between the start of the next positioning occasion of the reference cell and the start of the first positioning occasion of the reference cell at which the user equipment is to begin said positioning measurements.

27. The user equipment of claim 26, wherein the one or more processing circuits are configured to calculate said time difference as a function of a receipt timestamp defined as the time at which the user equipment received said assistance data, a measurement start time delay defined relative to said receipt timestamp, and a positioning occasion periodicity of the reference cell.

28. The user equipment of claim 25, wherein said positioning measurements comprise Reference Signal Time Difference (RSTD) measurements for Observed Time Difference of Arrival (OTDOA) positioning.

29. The user equipment of claim 25, wherein the wireless communication network comprises a Long Term Evolution (LTE) network, wherein the positioning signals comprise Positioning Reference Signals (PRS), and wherein the network node is an Evolved Serving Mobile Location Center.

* * * * *

UNITED STATES PATENT AND TRADEMARK OFFICE
CERTIFICATE OF CORRECTION

PATENT NO. : 9,188,660 B2  
APPLICATION NO. : 13/390366  
DATED : November 17, 2015  
INVENTOR(S) : Siomina et al.

Page 1 of 1

It is certified that error appears in the above-identified patent and that said Letters Patent is hereby corrected as shown below:

In the specification,

In Column 2, Line 26, delete "plane," and insert -- plane. --, therefor.

In Column 2, Line 39, delete "E-SMLC 14" and insert -- E-SMLC 18 --, therefor.

In Column 4, Line 60, delete "subfrarnes" and insert -- subframes --, therefor.

In Column 4, Line 61, delete "information," and insert -- information. --, therefor.

In Column 5, Line 12, delete "pica or" and insert -- pico or --, therefor.

In Column 5, Line 26, delete "LIE." and insert -- UE. --, therefor.

In Column 5, Line 58, delete "LIE" and insert -- UE --, therefor.

In Column 11, Line 42, delete "10-15 ms" and insert -- 10-15 ms), --, therefor.

In Column 12, Line 27, after Equation (2), insert -- , --.

In Column 13, Lines 7-8, delete "reception," and insert -- reception. --, therefor.

In Column 13, Line 16, delete "$T_{locolOffset}$" and insert -- $T_{localOffset}$ --, therefor.

In Column 14, Line 16, delete "dock" and insert -- clock --, therefor.

In Column 16, Line 4, delete "in be" and insert -- to be --, therefor.

Signed and Sealed this  
Seventh Day of June, 2016

Michelle K. Lee  
*Director of the United States Patent and Trademark Office*